July 14, 1931.  H. SCHARNAGEL ET AL  1,813,960

REFRIGERATING APPARATUS

Filed Sept. 29, 1926  5 Sheets-Sheet 1

INVENTORS
Herman Scharnagel
Matthew H. Loughridge
By M.H.Loughridge
ATTORNEY.

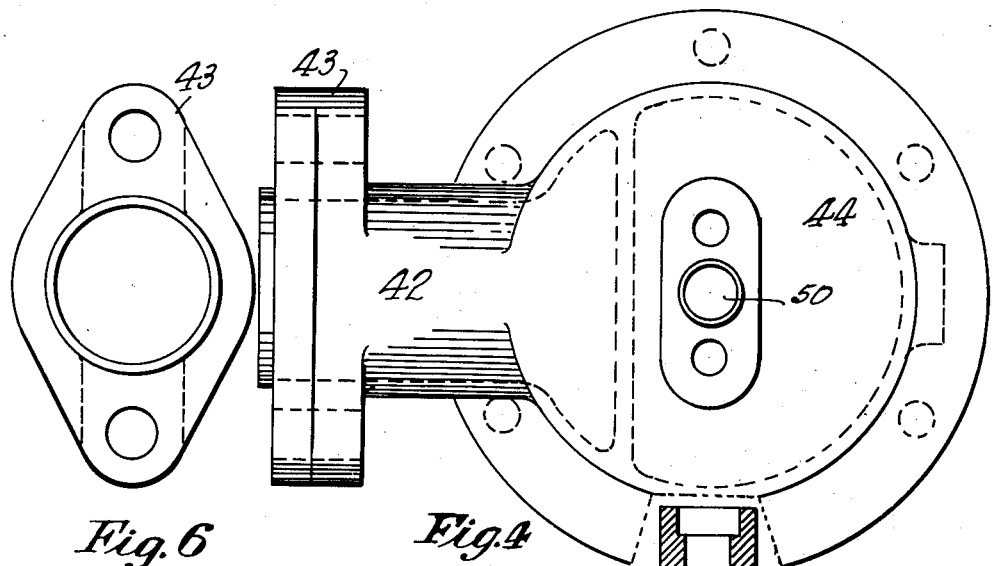
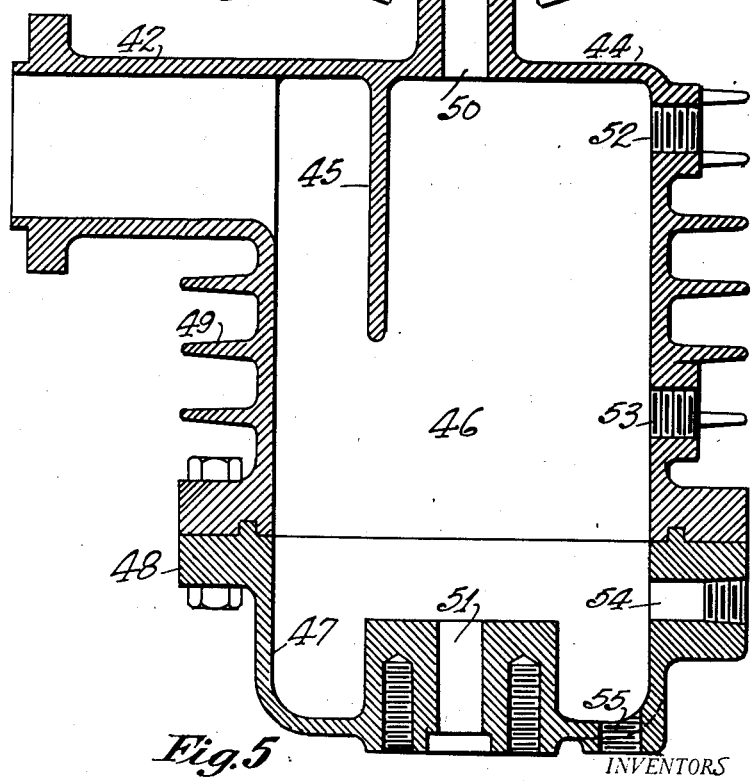

July 14, 1931.  H. SCHARNAGEL ET AL  1,813,960
REFRIGERATING APPARATUS
Filed Sept. 29, 1926   5 Sheets-Sheet 3

INVENTORS
Herman Scharnagel
Matthew H. Loughridge
By M. H. Loughridge
ATTORNEY.

July 14, 1931. H. SCHARNAGEL ET AL 1,813,960
REFRIGERATING APPARATUS
Filed Sept. 29, 1926 5 Sheets-Sheet 5

INVENTORS
Herman Scharnagel
Matthew H. Loughridge
BY
M. H. Loughridge
ATTORNEY

Patented July 14, 1931

1,813,960

UNITED STATES PATENT OFFICE

HERMAN SCHARNAGEL, OF TOMPKINSVILLE, NEW YORK, AND MATTHEW H. LOUGHRIDGE, OF BOGOTA, NEW JERSEY, ASSIGNORS TO HARRY W. DYER, OF NEW YORK, N. Y.

REFRIGERATING APPARATUS

Application filed September 29, 1926. Serial No. 138,444.

Figure 1:
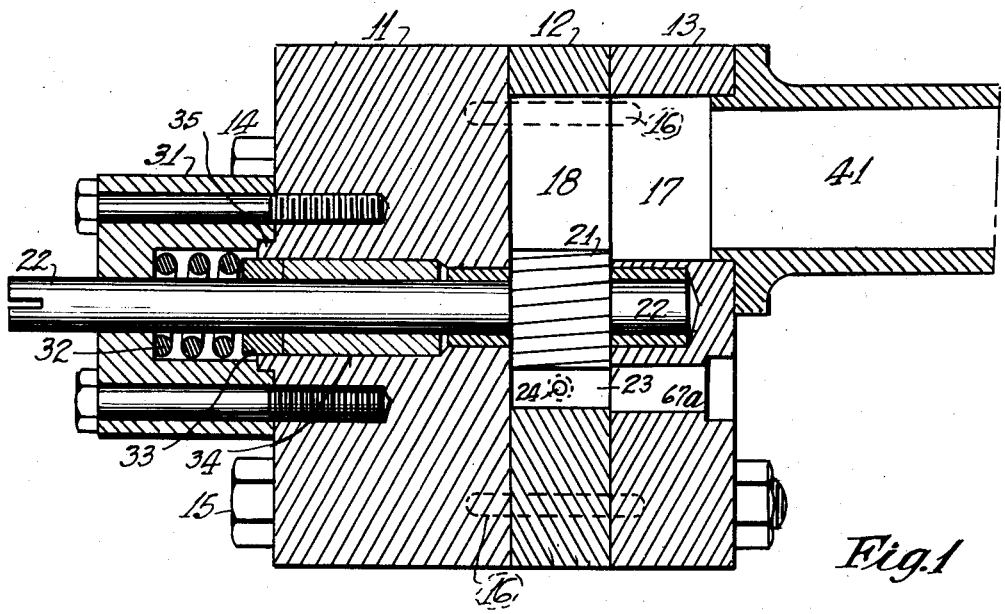
Figures 2, 3:
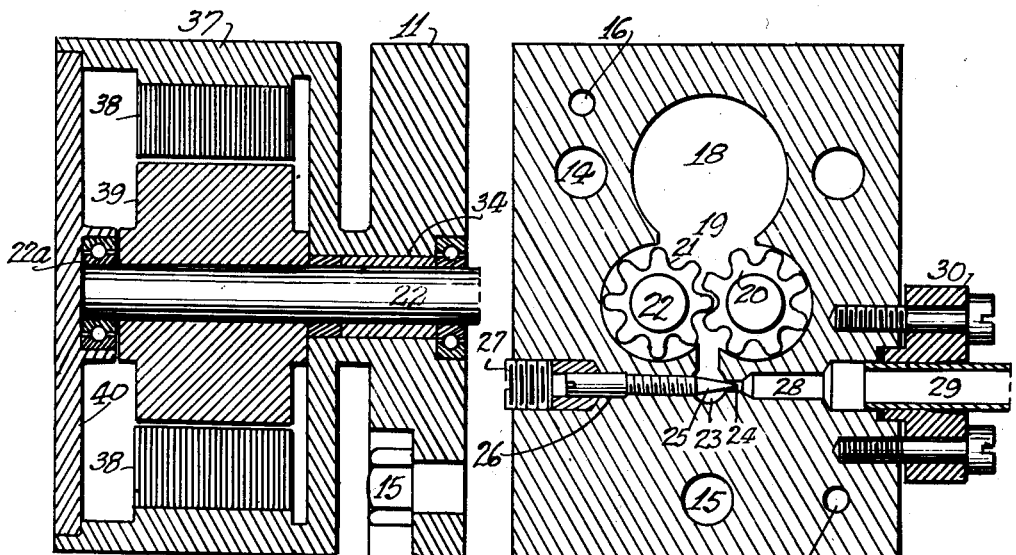
Figure 7:
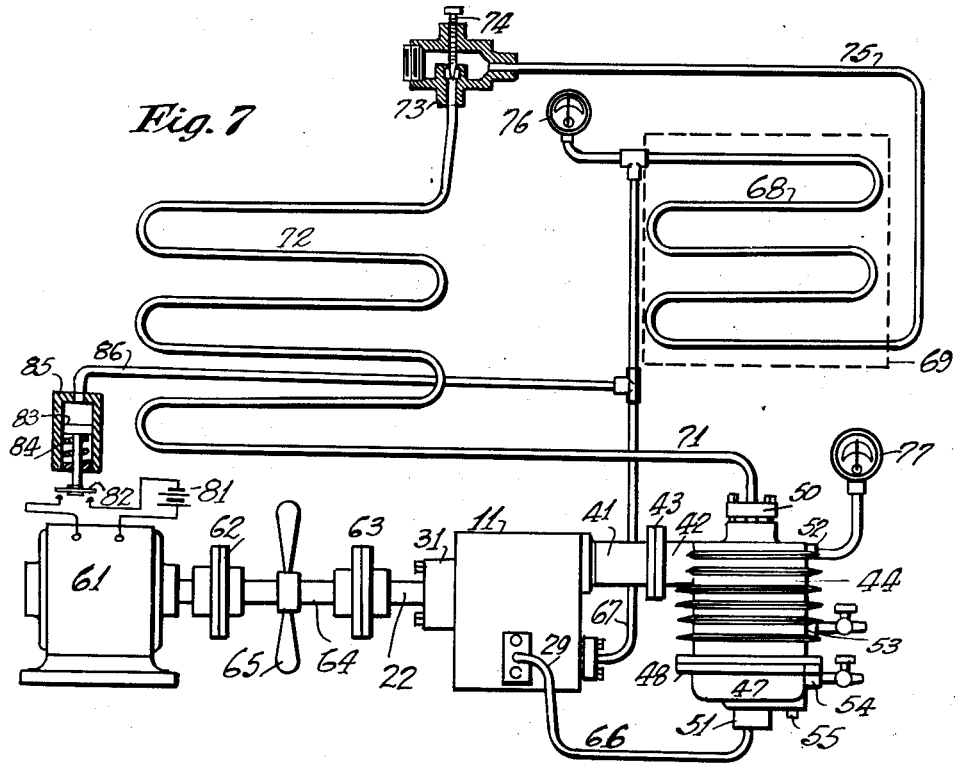
Figure 8:
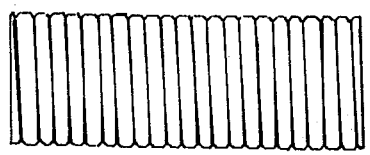
Figure 9:
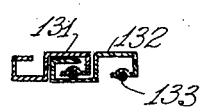
Figure 10:
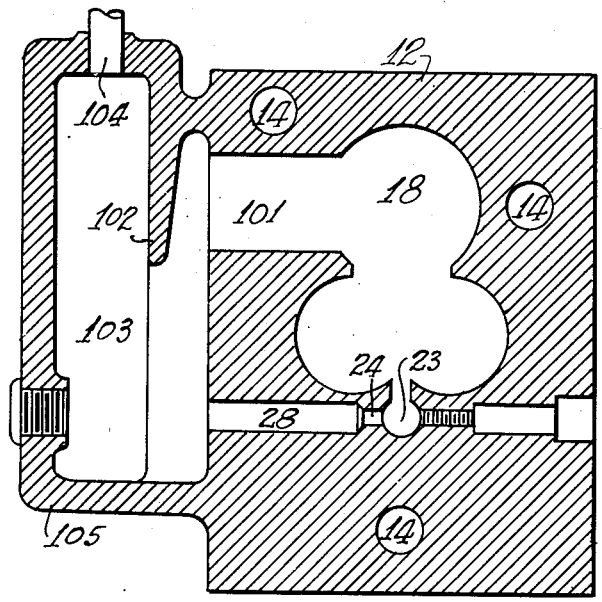
Figure 11:
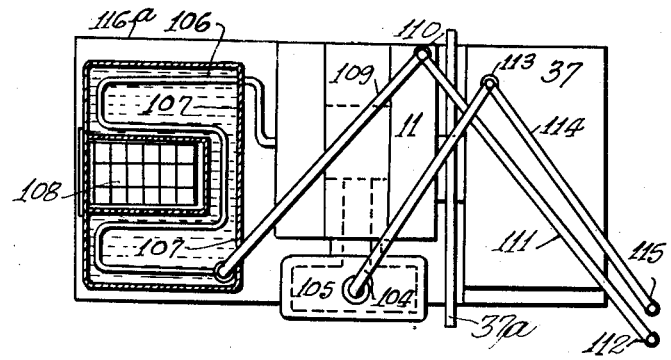
Figure 12:
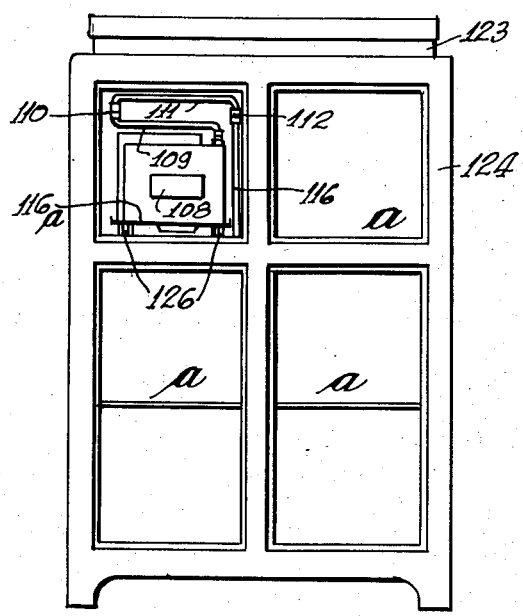
Figure 13:
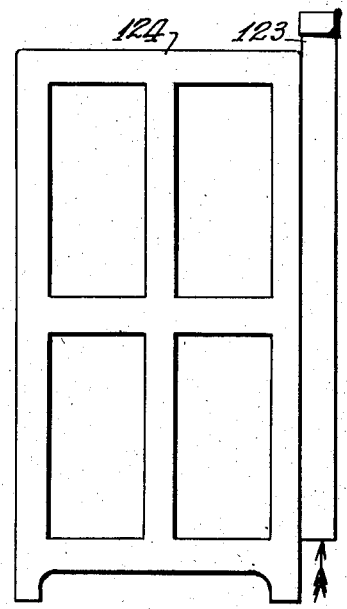
Figure 14:
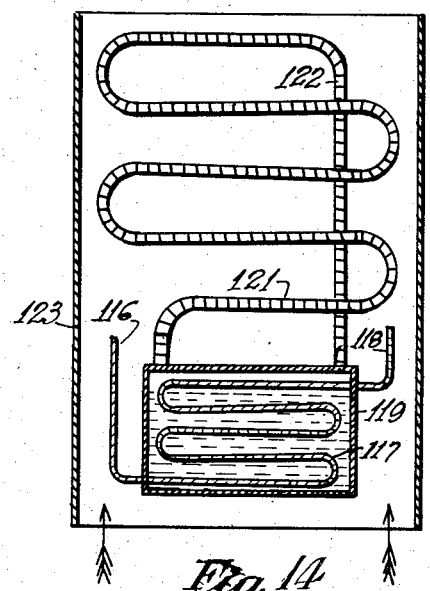

The invention relates to a mechanical refrigerating system and apparatus and has for an object to simplify the construction and improve the operation of mechanically operated refrigerators as more particularly described in the following specification and shown in the accompanying drawings, in which, Fig 1 is a sectional elevation of the pump mechanism used with this system, Fig. 2 is a sectional elevation at right angles to Fig. 1 showing the details of the pump mechanism, Fig. 3 is an alternative arrangement showing in section an induction motor for operating the pump, Fig. 4 is a plan view of the top of the oil separator, Fig. 5 is a sectional elevation of the oil separator, Fig. 6 is a front view of the coupling used between the pump and the oil separator, Fig. 7 is a diagram showing the method of connecting the various parts, Figs. 8 and 9 are details of flexible metallic hose that may be used for the piping with this invention, Fig. 10 is a modified pump construction, Fig. 11 shows a top plan view with certain parts in section of the pump, motor and cooling tank, Fig. 12 is a front view of a refrigerator with the doors open, Fig. 13 is a side view corresponding to Fig. 12 and Fig. 14 shows in section the condensing coil and associated apparatus.

The present invention comprises means for circulating a highly volatile refrigerant in a closed circuit system in which the refrigerant is forced by a pump through a condensing coil where it is air cooled and liquefied, then through an expansion valve, then through a cooling coil in the chamber to be cooled and back to the pump where the operation is repeated. The pump is driven by an electric motor and may be controlled automatically by a thermostat in the cooling chamber or may be controlled by the pressure in the system which varies with the temperature of the cooling chamber.

The pump is of the gear type directly connected on the motor shaft and operated through the medium of a heavy oil. The oil and the gaseous refrigerant are delivered to the pump at the same place, the delivery of the oil being controlled by a needle valve. The oil and gas mixtures are delivered at pressure to the oil separator where the oil by gravity is separated out and the refrigerant passes over to the condenser coil where it is cooled and liquefied by the circulation of air created by an air fan driven by the motor. After being liquefied the refrigerant passes through an expansion valve to the cooling coil in the cooling chamber from which it returns to the pump to be used again.

In the drawings, 11 is the pump which comprises a rectangular block to which the sections 12 and 13 are bolted by the bolts 14 and 15. These parts are maintained in alignment by the dowels 16. The section 13 has a circular aperture 17 which aligns with the aperture 18 above the gear chamber, Fig. 2 and with which it communicates through the aperture 19.

The pump comprises the gears 20 and 21. The gear 21 is mounted on the shaft 22 and driven by the motor hereafter described. This gear meshes with the gear 20. These gears have spiral teeth and rotate within the confined space shown.

The receiving chamber 23 is parallel with and below the gears and communicates with the gear chamber by the aperture shown. The oil enters this chamber through the pipe 29 which is bolted against the pump by the head 30 seating on a gasket. Through the passage 28 the oil enters the receiving chamber 23 through the port 24 which is adjusted by the needle valve 25 on the end of the screw 26. This screw is adjusted by a screwdriver when the plug 27 is removed. The refrigerant enters chamber 23 through the passage 67a, mixes with the oil and is taken up by the pump gears and delivered under pressure into the enlarged chamber 18 and from there through the connecting passage 41 to the oil separator hereafter described.

The shaft 22 of the pump gear is supported by an out-bound bearing 31 engaging the collar 35 of the casting 11 and secured in place by the bolts shown. The bearing of this shaft is made oil tight by the packing 34 which is compressed by the collar 33 and the spring 32. Where alternating current is available the enclosed induction motor shown in Fig. 3 is preferred to the open shaft construction in Fig. 1. In this case the shaft 22 is mounted on ball bearings as at 22a and carries the rotor 39 which is driven by the stator 38 in the housing 37. This housing is enclosed by an air tight end plate 40.

The oil separator 44 connects with the pump through the pipe 42, coupling 43 and pipe 41. Opposite the pipe 42 is the baffle 45 projecting into the chamber 46 and deflecting the mixture from the pump downwards into the base 47 which is detachably secured by the flange 48 to the upper section 44, and the latter is provided with fins at 49 to radiate the heat from the separator. The mixture settles in chamber 46 and the refrigerant separates leaving by the top opening 50 while the oil returns to the pump through the bottom opening 51. A pressure gage 77, Fig. 7 is connected to chamber 46 through the opening 52. Cocks are provided at 53 and 54 for the purpose of testing the oil level in chamber 46 and a drainage is provided at 55.

The system is operated as shown in Fig. 7 by motor 61 through shaft 64, couplings 62 and 63 and shaft of pump 22. The fan 65 is mounted on shaft 64 to cool the condenser 72. When the motor is running, oil is pumped from the separator 44 through pipe 66 and is discharged by the pump through pipe 41 under pressure back into the separator and is continually circulated in this manner.

Refrigerant is pumped from the cooling coil or evaporator 68 in the cooling chamber 69 through the pipe 67 after passing through the cooling chamber and is mixed with the oil from pipe 66 and discharged under pressure, with the oil through pipe 41 into the separator 44. In the separator the oil, by gravity, falls to the bottom and the refrigerant is released as a gas passing out at the top of the separator through pipe 71, condenser coil 72, where it is cooled by the fan 65, through the expansion valve 73, regulated by the needle valve 74 and through the pipe 75 to the cooling coil 68 and return to the pump by the pipe 67. A gage 76 may be provided to show the pressure in the return pipe 67.

The motor 61 may be automatically controlled by the pressure in the system through the connection 86 leading the gaseous refrigerant to act upon the piston 83 in cylinder 85 against spring 84. As the pressure is decreased the circuit of battery 81 operating the motor is disconnected at 82 and as the pressure is increased, this circuit is closed.

The construction in Fig. 10 is modified to show the oil separator as an integral part of the pump. The pump chamber 12 has a hollow T-shaped extension 105, Fig. 11 which constitutes the separator. A transverse channel 101 from the chamber 18 leads to the chamber 103 with the baffle 102 opposite the orifice of 101. The oil returns to the pump by the passage 28 near the base of 103 and the refrigerant is taken off by pipe 104 at the top.

The construction in Fig. 11 shows the motor, pump and cooling coil built as a consolidated unit on the same base with the object of saving space and making the apparatus convenient to apply in existing boxes. The base 116a supports the motor 37, the pump 11 and the cooling tank 107 in which the cooling coil 106 is placed. The ice tray 108 may also be placed in an aperture in this tank. A partition 37a may be used to separate the motor from the other apparatus or it may be otherwise insulated. The motor 37 is preferably of the induction type so that no exposed moving apparatus is used and the enclosed mechanism will run almost silently.

It is desirable that the base 116a be slidably mounted so that the apparatus may be removed from its housing for inspection and for cleaning of the housing. For this purpose the piping to the apparatus is expansible by the use of swivel joints in the pipes. Thus pipe 109 from the coil 106 is swiveled where it leaves the tank 107 and is swiveled at 110 where it joins pipe 111 and this pipe is swiveled at 112 where it connects to the pipe 116, Fig. 12 passing through the housing. The same construction is followed in pipe 104 from the separator 105 through the swivel 113, pipe 114 and swivel 115. It will be observed that this lazy-jack arrangement of piping permits the free sliding movement of the base 116a without disconnecting the apparatus. It should be noted that the swivel joints referred to are located in the compartment with the refrigerator unit and the connections are made to piping fixed in the refrigerator.

The apparatus in Fig. 11 is shown assembled in Fig. 12 in one chamber of the refrigerator 124, leaving the other chambers a—a free for refrigerating purposes. Slides 126 are provided below the base 116a to facilitate the removal of the apparatus.

The arrangement described does not include the condenser coil nor the means for cooling this coil. The common practice is to use a coil with a fan circulating air around it and this arrangement may be used with the construction described, however, it is preferred to eliminate the fan and all exposed moving apparatus and use instead a coil cooled by a flue arrangement located on the back of the refrigerator. This flue is indicated at 123, Fig. 13 and is shown partly in section in the elevation in Fig. 14. The condenser coil 117 is located in the tank 119 which is placed near the bottom of the flue 123. The condenser 117 connects by pipes 116 and 118 with the pipes 111 and 114, Fig. 11. The tank 119 is filled with a highly volatile liquid to which the pipe coil comprising the flexible metallic hose 121—122 is connected and spaced in the flue as shown. The heat from the condensing coil heats the tank 119 and causes a draft or circulation of air to rise in the flue which cools the tank and the flexible pipe coil 121. The heat from coil 117 causes vaporization of the liquid in tank 119 which vapour rises through the pipe coil to be cooled and condensed by the air circulation in the flue.

Any of the well known refrigerating fluids may be used with this system, such as methyl chloride which circulates in a closed circuit system and which is compressed by the pump, cooled in the condenser and passed through the cooling tank where it extracts heat from the brine, producing refrigeration and is returned to the pump, to repeat the cycle of operation.

A novel construction contemplated by this invention is the use of flexible metallic hose instead of solid piping. This hose, Fig. 8, is wound in a spiral from a strip of metal with overlapped interlocking edges as shown in section at 131, 132, Fig. 9. A layer of asbestos or sealing fibre 133 is placed between the sections which makes the hose pressure proof. The enlarged exposed metallic walls of this tubing make it particularly valuable in refrigerator work where large radiating areas are desired.

Having thus described our invention, we claim:

1. A refrigerating system as described comprising a cabinet with an evaporator therein, said evaporator mounted on a slide for sliding into and out of said compartment, a condenser located outside said cabinet, and piping connecting said evaporator with said condenser, said piping arranged to expand like a lazy-jack to permit said evaporator to move on said slide.

2. A refrigerator system as described comprising a cabinet with an evaporator therein, a vertical flue located at one side of said cabinet, a tank containing a volatile liquid, a condenser located in said tank connected with said evaporator and a coil extending from said tank through said flue.

3. In a refrigerating system as described, the combination, a motor, a pump operated by said motor, a condenser and a cooling element, means connecting said pump, condenser and cooling element for the circulation of a refrigerant in said system, said condenser comprising coils formed from flexible metallic hose.

4. A refrigerating system as described comprising a cabinet having a compartment, a refrigerating unit comprising a pump and an evaporator housed in said compartment and mounted to be movable from said compartment, a condenser forming part of said system located outside said compartment and piping connecting said condenser and said unit for the circulation of a refrigerating medium therein, said piping connections being provided with hinged joints within said compartment to permit the free movement of said refrigerating unit on said mounting substantially from said compartment.

5. In a refrigerating system, the combination, a motor, a pump operated by said motor, a condenser and an evaporator, and means comprising flexible metallic hose made from a spirally wound strip of metal for connecting said pump, condenser and evaporator in a closed system for the circulation of a refrigerant therein.

In testimony wereof we affix our signatures.

MATTHEW H. LOUGHRIDGE.
HERMAN SCHARNAGEL.